United States Patent [19]

Puryear

[11] 4,196,870

[45] Apr. 8, 1980

[54] DRAG CLICK DEVICE FOR FISHING REEL

[75] Inventor: John W. Puryear, Tulsa, Okla.

[73] Assignee: Brunswick Corporation, Skokie, Ill.

[21] Appl. No.: 932,793

[22] Filed: Aug. 11, 1978

[51] Int. Cl.² ............................................. A01K 89/02
[52] U.S. Cl. ............................................... 242/84.51 A
[58] Field of Search ............... 242/84.21 A, 84.21 R, 242/84.2 R, 84.51 A, 84.51 R, 84.5 A

[56] References Cited

U.S. PATENT DOCUMENTS

| | | | |
|---|---|---|---|
| 2,676,769 | 4/1954 | Sarah | 242/84.21 R |
| 3,222,009 | 12/1965 | Sarah | 242/84.21 A |
| 3,223,349 | 12/1965 | Holahan | 242/84.2 A |
| 3,810,592 | 5/1974 | Host | 242/84.51 A |

*Primary Examiner*—Billy S. Taylor
*Attorney, Agent, or Firm*—John G. Heimovics

[57] ABSTRACT

This invention comprehends a device for producing a clicking sound that is part of the free-floating drag in spinning type fishing reels. When a fisherman is playing in a fish trying to land the fish, it has been found desirable to let the spool rotate slowly letting out a small amount of line so that the line will not snap in two. Since the fisherman is busy, an audible clicking sound indicating that the spool is rotating is a help and assistance.

6 Claims, 9 Drawing Figures

DRAG CLICK DEVICE FOR FISHING REEL

BACKGROUND OF THE INVENTION

1. Field of the Invention

This invention relates to spinning style fishing reels, and more particularly, relates to a clicker device that indicates when the spool that holds the line on the fishing reel is rotating.

2. Background of the Prior Art

It is well known in the prior art to have clicker devices that indicate that the spool is turning. In conventional and skirted type spinning reels this device is normally located behind the spool and connected in one fashion or another to the reel's main shaft. Usually a short weak clicker spring is mounted on the spool and a rather large ratchet or gear is mounted on the main shaft for interaction therebetween, thus, causing a clicking sound. The use of the gear or ratchet makes it necessary to remove the reel's main shaft before the winding cup can be removed. It has been found desirable to position the clicker spring in the back of the reel away from the spool so that the winding cup can be removed without first removing the shaft from the reel. The prior art fails to teach how this may be accomplished in a well designed fashion.

SUMMARY OF THE INVENTION

This invention relates to a clicker device on a spinning type reel that overcomes the difficulties of the prior art. The device comprehends using a unique free-floating drag located at the back of the housing. The unique drag has a rotatable drag cup that has teeth on the exterior periphery. The clicker device cooperatively operates in conjunction therewith.

It is therefore an object of this invention to provide a clicker device capable of producing an audible sound when the spool of a spinning style fishing reel is rotating.

It is another object of this invention to provide a clicker device that is mounted deep within the housing of the reel away from corrosive material that can be picked up by the fishing line.

A feature of this invention is utilizing the free-floating drag cup to provide a cyclic motion that is used by the clicker to make an audible sound.

The above and other and further objects and features will be more readily understood by reference to the following detailed description and accompanying drawings.

DESCRIPTION OF THE PREFERRED EMBODIMENT

Figure 1:
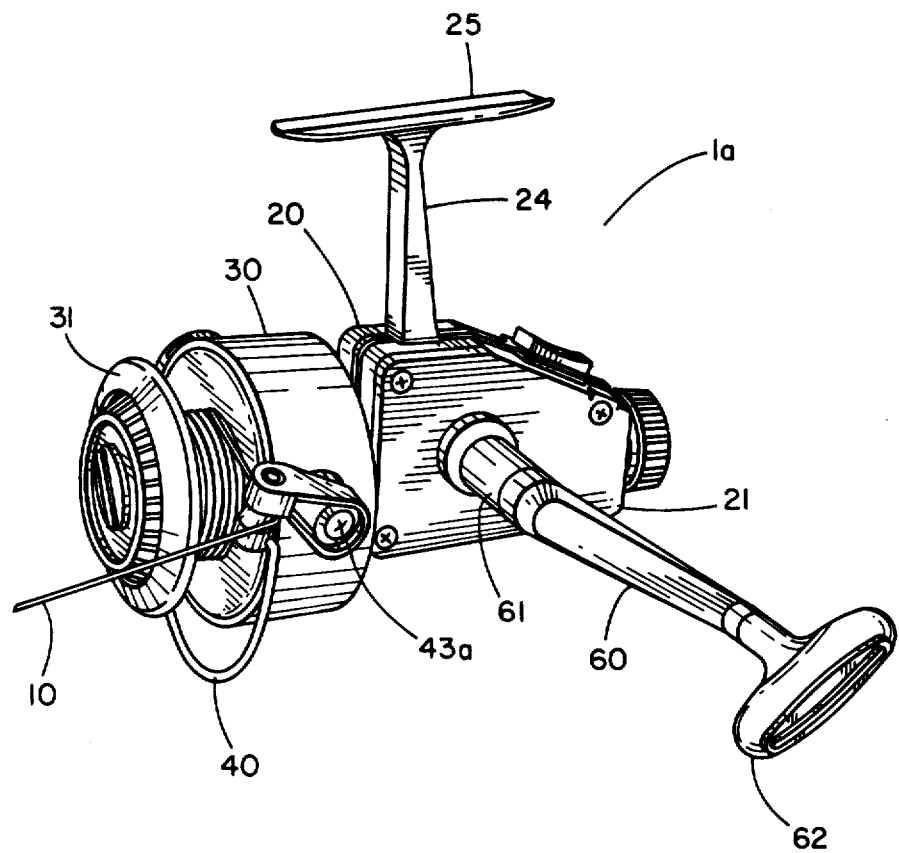
FIG. 1 is a perspective view of the conventional style spinning reel containing the invention described herein.
Figure 2:
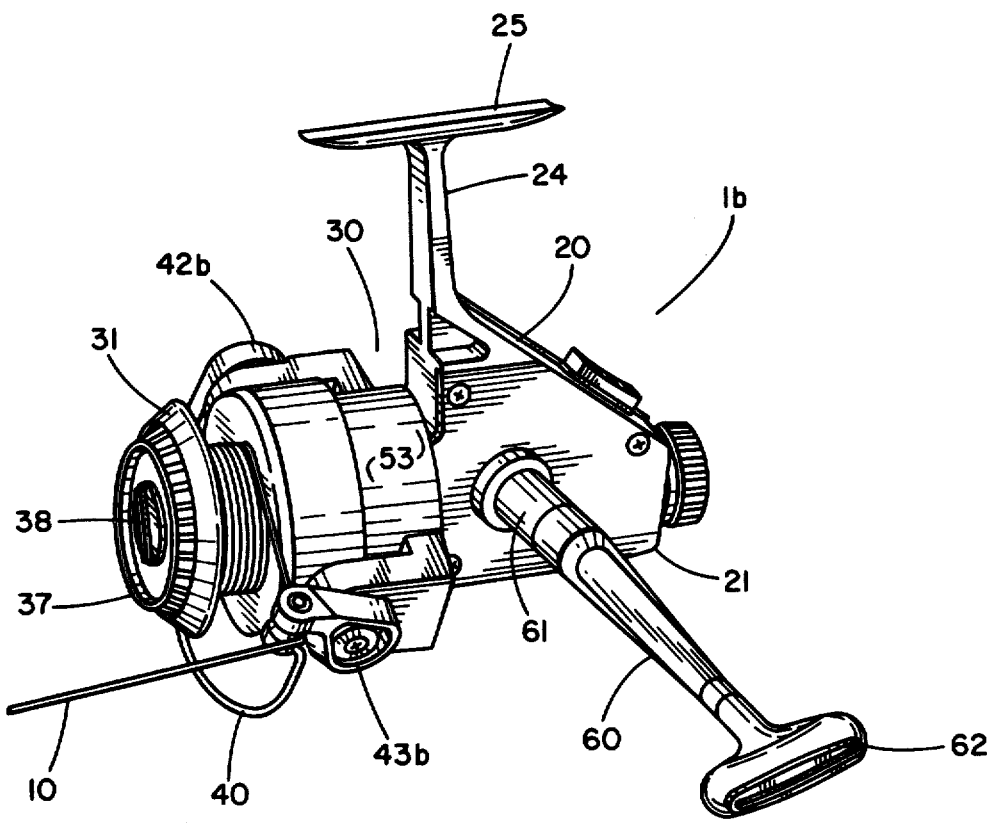
FIG. 2 is a perspective view of the skirted style spinning reel containing the invention described herein.

In FIG. 1, a conventional style open-face fishing reel 1a is shown and in FIG. 2 a skirted style open-face fishing reel 1b is shown. Both styles of reels function similarly, the only exception being the arrangement of the spool. As used hereinafter, the same numerals will designate the common parts for both reels; for special parts on the reels different numerical designations will be used. The reel 1a and 1b having a housing 20 which includes an integral gear case 23, a stem 24 which connects the housing to a shoe 25. The shoe is used to attach the reel to spinning style fishing rods. The reel includes a crank assembly 60, rotatable about a crank shaft hub 61 with a rotatable winding handle 62 for use by a fisherman with his left hand for line retrieval while the rod (not shown) is being held by the right hand as shown in FIGS. 1 and 2 only. As will be described hereinafter, the handle 60 may be disposed on the other side of the gear case 23 for accommodating the personal desires of the user.

An axially mounted rotor housing 30 is provided and adapted to rotate about the axis of the spool 31 as the crank 60 is turned for line retrieval, with the line 10 being captured by the bail 40 passing over the line guide assembly 41 as shown. Bail 40 and line guide 41 rotate with rotor 30 and the line 10 is thereby wound on the spool 31. The shank of the screws 32 and 33 function as rotary pivot bearing points and are accordingly the centers of rotation for the bail 40 via the bail arms 42a, 42b, 43a and 43b. An internal mechanism causes the line spool 31 is reciprocate axially back and forth as the rotor 30 winds the line 10 about the spool 31; but as in spinning reels generally, the spool 31 does not rotate about its central core axis, except as controllably permitted by the adjustable free-floating drag mechanism 50. Such permitted rotation of the spool may occur during the line retrieval when a fish is on the other end of the line 10 fighting for its life while still in the water; and, thus the force of the drag friction is overcome by tension in the line. When the bail 40 is swung open from the line 10 to an open position for casting, the line 10 may freely pay out from the spool 31 over lip 99. In FIGS. 1 and 2, the bail 40 is shown in the "closed", "retrieve", or "rewind" position. The line guide roller 410 is preferably rotatable, that is, it is preferably a miniature pulley to reduce the sliding friction which might otherwise cause line wear.

In paying out the line 10 over the lip 99 of the forward flange of the line spool 31 during casting, the fisherman using an open face spinning reel is obligated to use his finger to snub the line and arrest its pay out, since the normal line drag provisions are not operative unless the reel is in the rewind or line retrieval mode of operation.

In the overall arrangement of the reel a cover plate 21 is secured to the gear case 23 by screws 26. Inside the gear case 23 is a gear assembly 70 that is rotatable by rotating the handle 62 about the hub 61. Oscillator gear 73 is rotatably mounted on stub shaft 27 which may be part of the interior of the housing gear case 23 or secured separately thereto. Gear 73 has an inwardly projecting plug 74 that fits into groove 76 of oscillator slider 75. Rotation of the gear 73 causes the slider 76 to slide forward and backward. Crank shaft gear assembly 64 has a tubular center shaft 65 that is journal mounted in bearings 66 in gear case 23 (partly shown) and in cover plate 21. The shaft 65 has an internal right hand thread that mates with the right hand thread 67c of shaft 67 on one side and a left hand thread that mates with left hand thread 67d when the shaft is placed on the other side of the reel. This dual threaded system enables the reel to be cranked both from the right hand and the left hand. The open end of the shaft 65 (the end which the shaft 67 is not inserted) is closed off by inserting screw cap 6 exterior of the gear case 23.

Small gear 68 meshes with gear 73 as the handle 62 rotates the shaft 67 thus providing the back and forth sliding motion to slider 75. A pinion gear assembly 80 is forwardly rotatably journal mounted in bearing 2 that is mounted in the forward section 22 of the housing 20 and secured there by bearing retainer 3 which fits into groove 4. The assembly 80 has a forward shaft 81 with oppositely spaced flats 82 thereon, a central bore 83, a forward threaded portion 84, a rearwardly projecting bearing stud 85 and a gear 86. The bearing stud 85 fits into bearing mount 28 which is part of housing 20. Thus, the pinion assembly 80 has two-point bearing support. The larger gear 69 engages pinion gear 86 causing it to rotate.

The center shaft 11 has back square portion 12, undercut grooves 13, front pin 14 which press fit into the shaft 11 and a front threaded portion 15. The shaft 11 slip fits into the pinion bore 83 and is supported thereby. The shaft 11 also fits through the hole 77 in slider 75. Special clip 16 fits around the hole 77 and slides into grooves 13 locking the shaft 11 to the slider 75. Thus, when the slider oscillates back and forth the shaft 11 also moves back and forth with respect to the forward section 22 of the housing 20.

The rotor 30 is mounted on the forward portion 81 of assembly 80. The hole 34 with flats 34c is sufficiently large to pass over the pin 14 and then tighten on the forward threaded portion 84 by use of tang 35 and nut 36; the respective flats 82 and 34c operable with each other. The spool 31 fits over the shaft 11 with the spool retainer knob that is retained near the lip 99 having an internal threaded portion 39 that tightens down on thread 15. Thus, as the handle 62 turns the crank shaft 67, the gear assembly 64 causes the pinion assembly 80 to rotate which in turn causes the rotor 30 to rotate. At the same time rotation of gear 73 causes the slider 75 to reciprocate back and forth which causes the shaft 11 to move back and forth, so that line 10 can be wound during the retrieve mode in an orderly and uniform fashion on spool 31.

Figure 3:
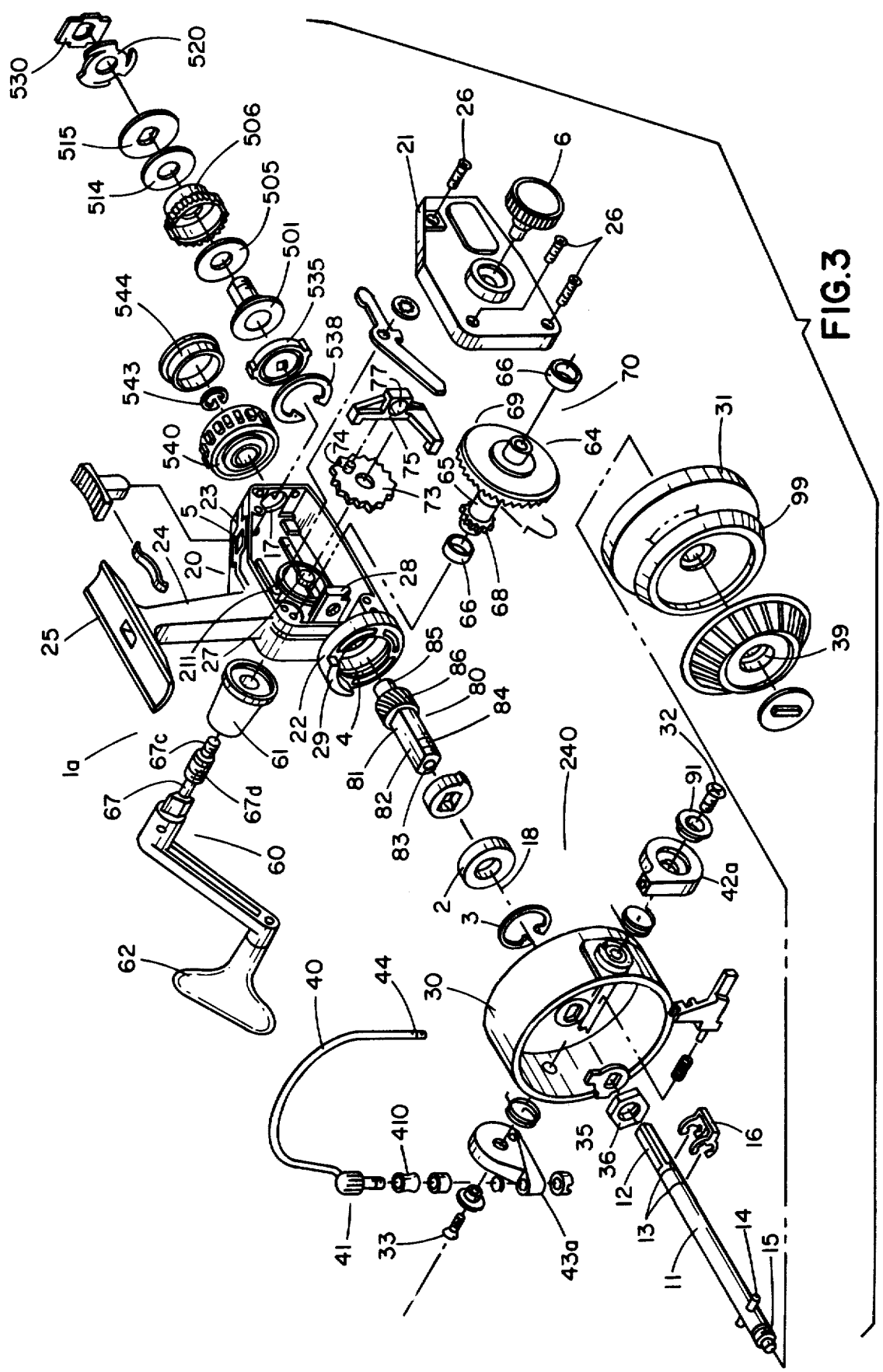
FIG. 3 is an exploded perspective view of the conventional style spinning reel containing the invention described herein.
Figure 4:
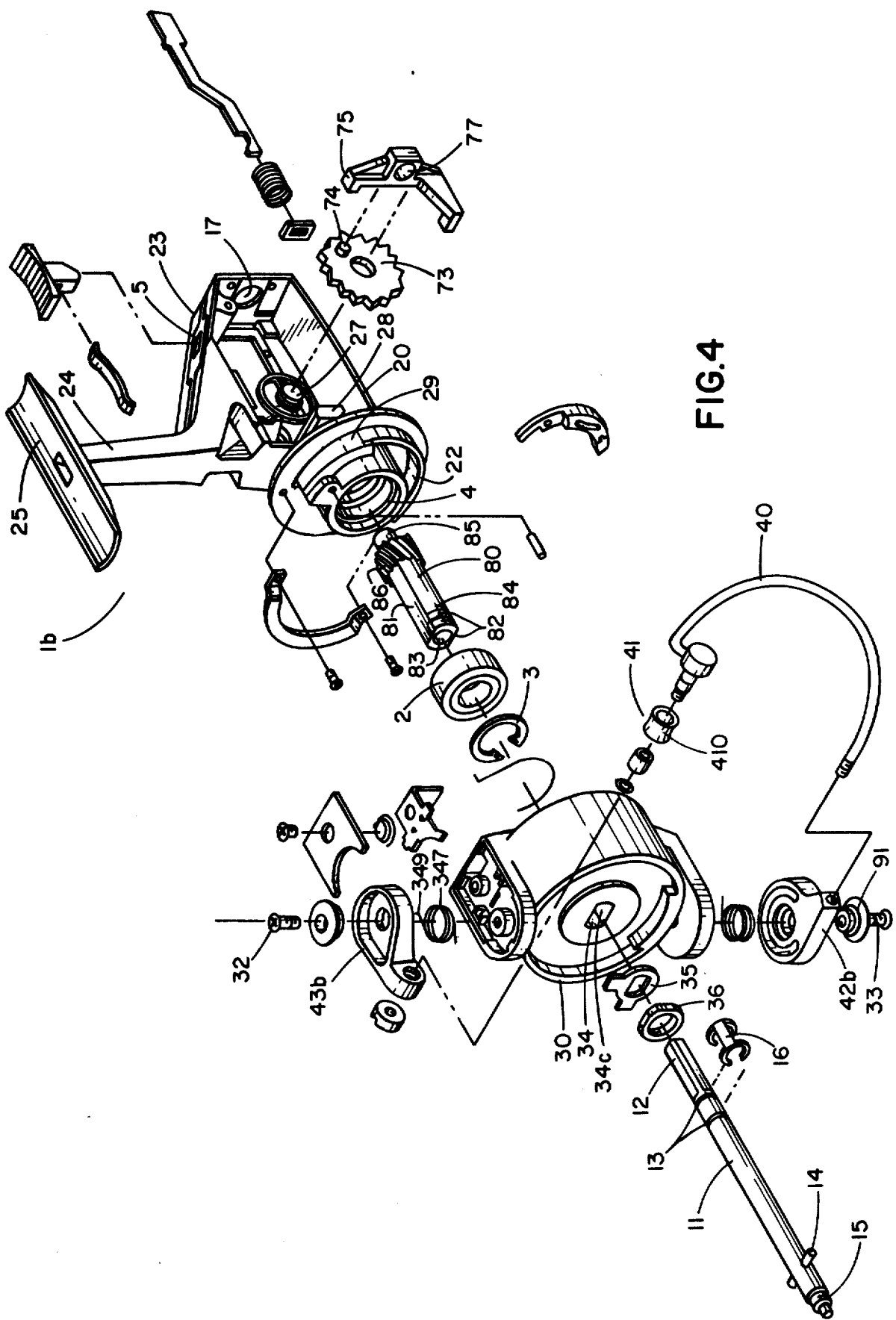
FIG. 4 is an exploded perspective view of the skirted style spinning reel not depicting some of the parts in common with the conventional reel shown in FIG. 3 but capable of incorporating the invention described herein.
Figure 5:
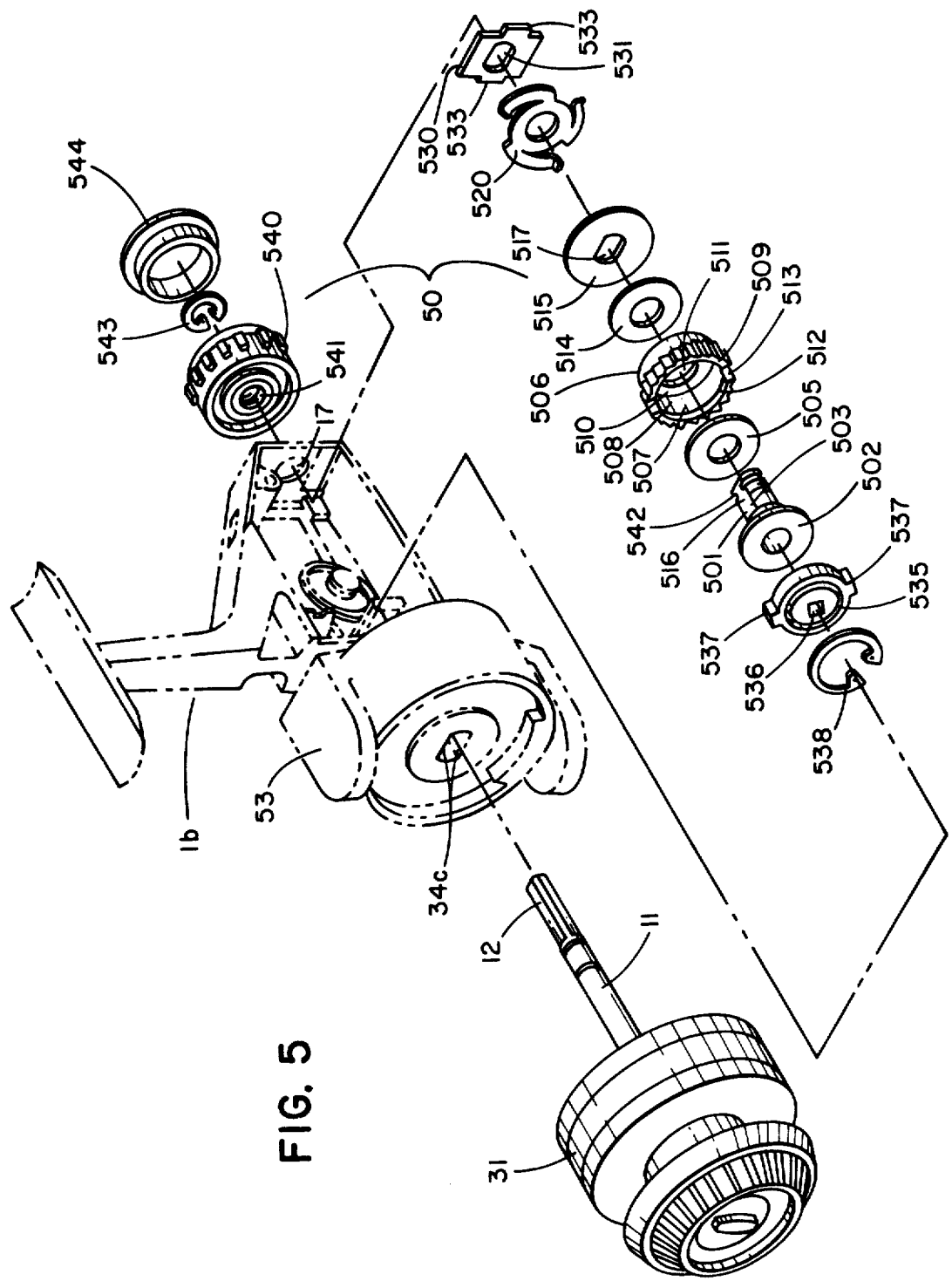
FIG. 5 is an exploded perspective view of the skirted style spinning reel shown in phantom and the drag mechanism shown in detail.
Figure 6:
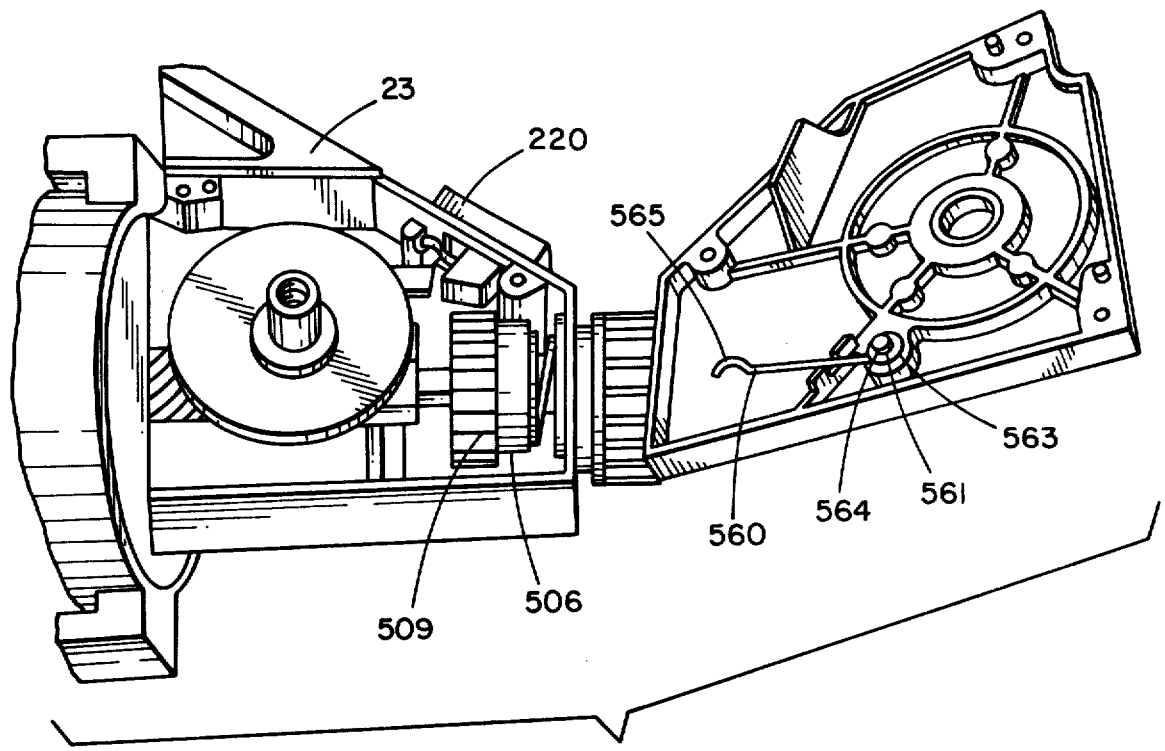
FIG. 6 is a perspective view of a part of the reel housing with the housing cover opened depicting an embodiment of this invention.
Figure 7:
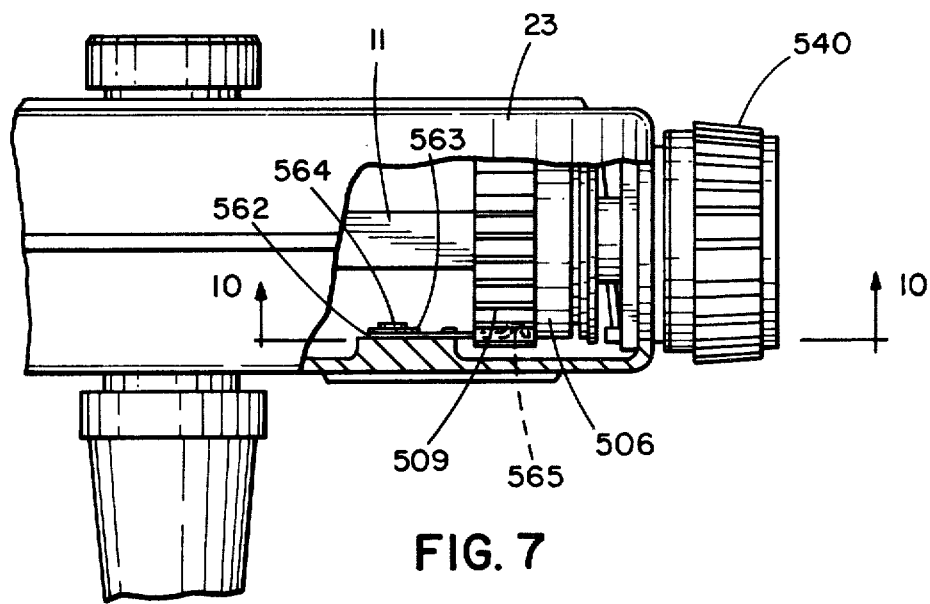
FIG. 7 is a cutaway partial bottom view of the reel depicting the embodiment of this invention.
Figure 8:
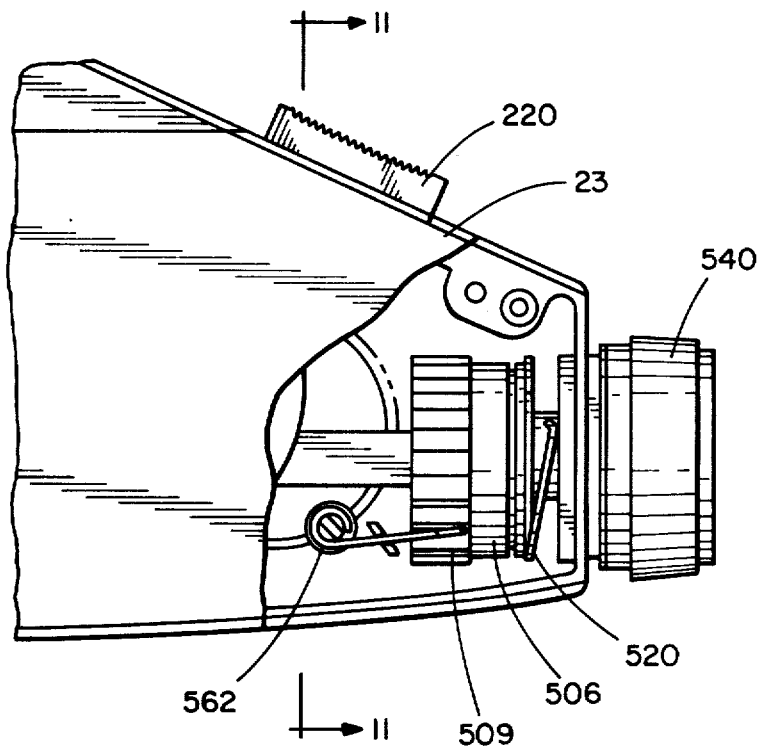
FIG. 8 is a cutaway partial side view of the reel depicting the embodiment of this invention.
Figure 9:
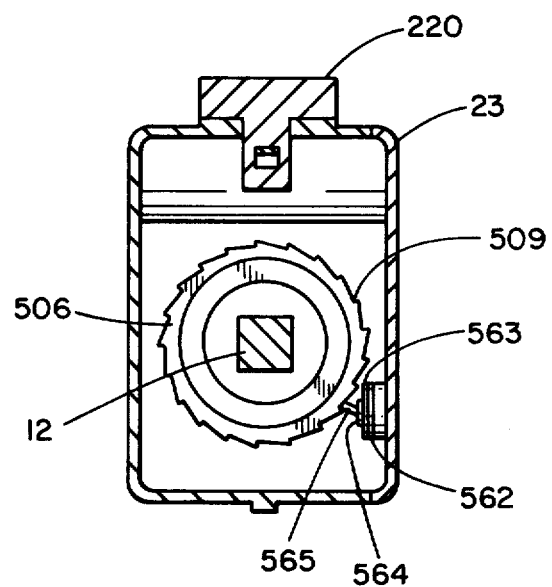
FIG. 9 is a cross sectional view taken from FIG. 8 depicting an embodiment of this invention.

Contrary to standard spinning reels that have their drag associated with the front spool or locked into the back portion of the housing, the drag mechanism 50 is free-floating (it is self-contained as a unit and not captured in the housing). As best seen in FIGS. 3 and 5, the drag housing cup 506 has an internal cavity 507 with a back closure 510 with a concentric hole 511 therein. A first flat friction disc washer 505 with a round hole fits inside cup 506. The drag adjustment screw 501 with elongated shank 503 having a threaded portion at one end and side flats 516 is positioned so that the shank 503 extends out the back side of the closure 510. The disc 505 being captured between closure 510 and the washer portion 502 of the screw 501. A disc drive 535 with lugs 537 fits into the cup cavity 507 with the lugs 537 fitting in notches 513. Retainer clip 538 is secured to the front groove 512 to prevent the drive 513 from becoming disassembled from the cup 506. On the rearward extending shaft 503 a second friction disc 514, a flat washer 515 with hole 517 that matches the cross section of the shaft 503, a disc spring 520 and a rectangular aligning plate 530 with hole 531 similar to 517 is placed thereon. This compact unit comprises the forward portion of the drag mechanism 50 that is contained within the gear case 23. The remaining portion of the shank 503 slips through hole 17 at the back of the housing 20. Adjustment knob 540 is secured on the shaft 503 by means of internal nut 541 and locked in place by positioning retainer 543 in groove 542.

The square end 12 of the shaft 11 slip fits into hole 536. When the knob 540 is tightened against the housing case 23, spring 520 becomes trapped between the plate 530 and the washer 515. As the knob 540 is further tightened, the friction discs 505 and 514 clamp the back closure 510 tighter and tighter thereby preventing the cup 506 from rotating. Since the square end 12 of the shaft 11 is keyed to the drive 535 and the rectangular shape of plate 530 and the lugs 533 prevent the mechanism 50 from rotating inside the gear case 23, the shaft 11 is thereby prevented from rotating; thus the drag is fully functional and there is no rotational movement of the spool 31. When the knob 540 is loosened, there is less clamping force by the discs 505 and 514 and therefore limited rotation of the free-floating mechanism 50 is permitted which in turn permits limited rotation of the spool 31 when there is tension force on the line 12.

When a fisherman has a fish pulling on line 10, the drag mechanism is normally set to let the spool 31 rotate slowly letting the line 10 slowly out over the roller 410. Since the fisherman is busy trying to land the fish, he does not have time to observe the speed with which the spool is rotating. Therefore, a drag clicker device has been utilized to produce an audible "clicking" sound indicating if the spool is rotating and he can also tell by the rapidity of the clicks how fast the spool is rotating. In the preferred embodiment of the invention shown in FIGS. 6, 7, 8 and 9 a drag clicker is depicted. When the spool 31 is rotating, the drag cup 506 is also rotating at the same speed. A spring wire 560 is attached to the inside cover plate 21 at 561. In one preferred embodiment the wire 560 has a circular end portion 562 as shown in FIG. 11 that is used to secure it to plate 21 by covering end 562 with washer 563 and staking the projection 564 over to capture washer 563 thus clamping wire end 562 in place. When cover 21 is attached to case 23 the semi-circular bent end 565 is direct contact with the teeth 509 of cup 506. As the cup 506 rotates, the wire 560 vibrates with a clicking sound as each tooth 509 strikes the end 565. The gear case 23 acts as a sounding box and magnifies the clicking sound thus making it audible for the fisherman. In another embodiment of the invention, the spring wire 560 may be replaced by a rectangular or flat shaped wire and attached to the cover plate in a similar fashion.

Although specific embodiments of the invention have been described, many modifications and changes may be made in the fishing reel without departing from the spirit and scope of the invention as defined in the appended claims.

What is claimed is:

1. In an open face spinning reel used for casting a bait attached to a fishing line and for retrieving the bait and fishing line after casting, the reel having a housing, a center shaft mounted in the housing, a spool mounted on the shaft for holding the fishing line, a handle and gear train assembly mounted in the housing, a rotor coaxially mounted on the shaft and rotatable by cooperative movement of the handle and assembly, and a movable bail mounted on the rotor having an open casting position and a closed retrieving position, limited rotation of the spool being desirable when retrieving the bait with the fish caught thereon, a free-floating drag assembly having a housing cup mounted on an adjustment screw that is coaxial with the shaft, limiting the rotation of the spool, an improved click signal device for indicating when the spool is rotating comprising:
(a) the cup having a substantially flat back closure with a center hole therein and a circular side wall secured at a first end to the closure and a second end being open, the wall having a serrated tooth-shaped exterior surface and at least one open notch extending through the wall at the second end,
(b) a drive mounted in the cup having a central hole keyed to the shaft, the drive having a lug mating with the notch in the cup wall so that when the shaft rotates the drive causes the cup to rotate; and,
(c) a thin cantilever with a captive end attached to the reel housing and free end in operable contact with the serrated toothshaped exterior whereby the cantilever vibrates making a clicking sound when the cup rotates.

2. The reel of claim 1 wherein the cantilever is a spring.

3. The reel of claim 1 wherein the reel housing has a removable side plate to which the cantilever is secured.

4. The reel of claim 2 wherein the free end has a semi-circular bend.

5. The reel of claim 2 wherein the spring is made from a round wire.

6. The reel of claim 2 wherein the spring is made from flat strip.

* * * * *